No. 681,887. Patented Sept. 3, 1901.
I. D. RICHHEIMER.
COFFEE COOLING APPARATUS.
(Application filed Mar. 30, 1901.)
(No Model.)
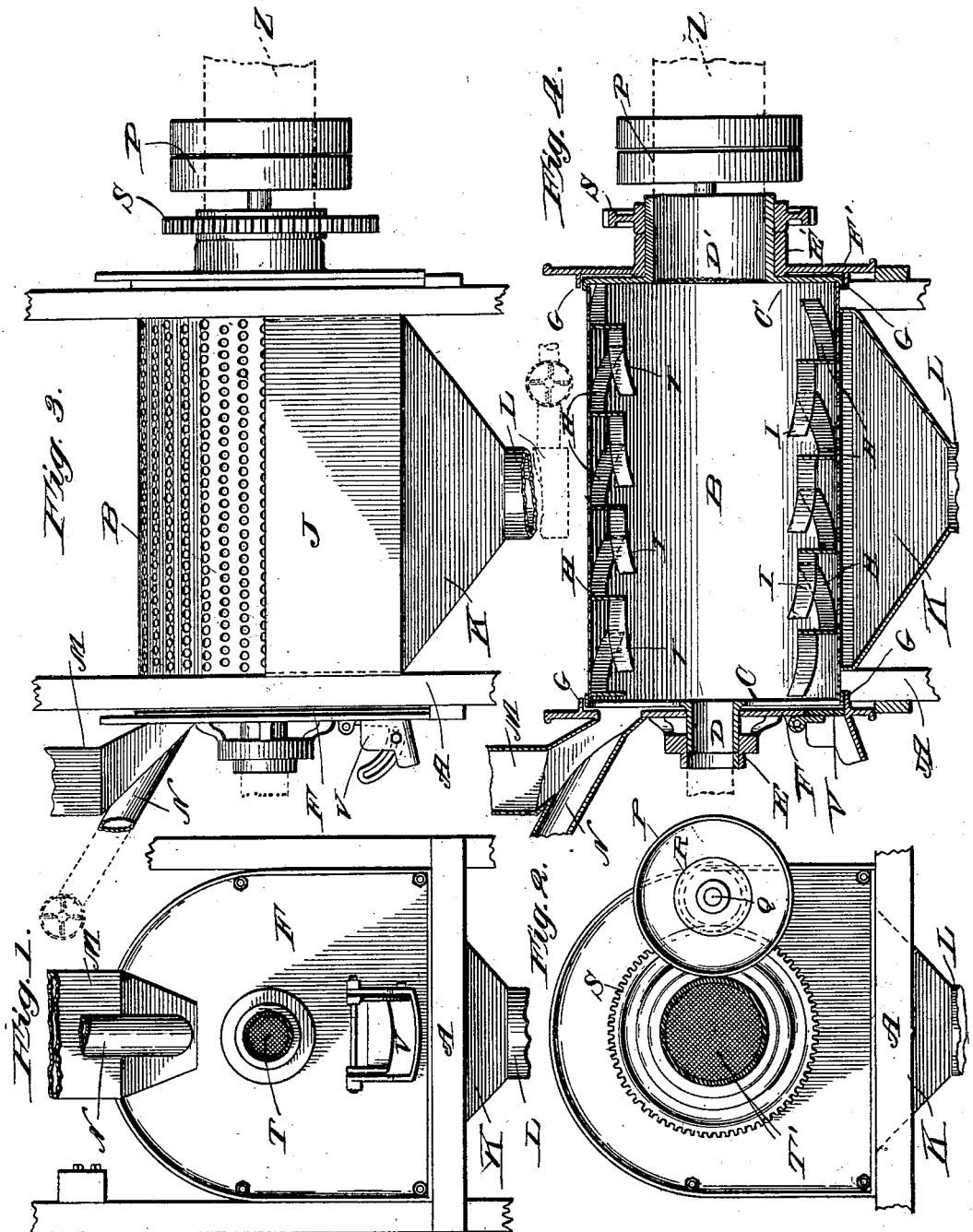

UNITED STATES PATENT OFFICE.

ISAAC D. RICHHEIMER, OF CHICAGO, ILLINOIS.

COFFEE-COOLING APPARATUS.

SPECIFICATION forming part of Letters Patent No. 681,887, dated September 3, 1901.

Application filed March 30, 1901. Serial No. 53,615. (No model.)

*To all whom it may concern:*

Be it known that I, ISAAC D. RICHHEIMER, a citizen of the United States, residing at Chicago, in the county of Cook and State of Illinois, have invented certain new and useful Improvements in Coffee-Cooling Apparatus, of which the following is a specification.

My invention relates to an apparatus for quickly cooling coffee after it leaves the roaster; and its object is to provide an apparatus simple in construction, inexpensive to manufacture, and easy to operate which can be used in conjunction with a coffee-roaster and arranged to receive the coffee directly from the roaster and cool it rapidly and thoroughly.

The invention also has for its object to provide a rotatable cooling-cylinder to receive coffee and keep it in a constant state of agitation while a current of air is passed through the cylinder and coffee contained therein and drawn off at the bottom of the cylinder.

With these and other ends in view the invention consists in the novel construction and arrangement of parts hereinafter described, and shown in the accompanying drawings, in which—

Figure 1 is a front view of a coffee-cooling apparatus embodying my invention. Fig. 2 is a rear view of the apparatus. Fig. 3 is a side elevation. Fig. 4 is a longitudinal sectional view.

Referring to the drawings, in which like letters of reference denote corresponding parts in all of the figures, A designates a suitable support for my improved apparatus, which may be suspended from the ceiling or supported upon a floor. The apparatus comprises a foraminous cylinder B, which is carried by the spiders C C' on the trunnions D D', these trunnions being journaled, respectively, in bearings E E' in the front and rear heads F F', which are maintained in a stationary position in the embodiment of the invention illustrated in the drawings. Each of the heads is provided with an inwardly-directed annular flange G, within which the cylinder B is arranged to operate. Within the foraminous cooling-cylinder B, I provide agitating devices for stirring the coffee up while the cylinder is revolving. I have found that the flights illustrated in Fig. 4 accomplish this result in a satisfactory manner, although I do not limit myself to this particular kind of agitating device. In the arrangement shown in the drawings two sets of oppositely-arranged agitating devices are secured within the cylinder, each of these sets comprising a series of outer flights H and a series of inner flights I, mounted upon the outer flights and inclined in an angular relation to the outer flights. The upper portion of the cooling-cylinder is exposed, as shown in Fig. 3; but the lower portion is inclosed within a casing J, which is contracted at the bottom at K into the general form of a funnel and provided with a pipe L, through which the air circulated through the coffee is drawn off therefrom and discharged. The roasted coffee while still hot is discharged through a chute M into the upper part of the cooling-cylinder through one end thereof, and in order to distribute the coffee to the other end of the cooling-cylinder I connect the air-supply pipe N to said inlet-chute, as shown in Figs. 3 and 4, so that the air-pressure will assist in carrying the coffee to the rear end of the cooling-cylinder. The cylinder is revolved by means of power communicated to a pulley P on the shaft Q, which also carries a gear R, meshing with the gear S, fast on the trunnion D'; but any suitable form of driving means may be employed and still be within the scope of my invention. The trunnions D D' are preferably hollow, but provided with screens T T' to prevent the coffee from passing or being thrown out of the cylinder therethrough, and in the front of the cylinder I provide a discharge-opening, which is closed by means of a swinging door V and through which the coffee may be discharged after it has been properly cooled.

The operation of the apparatus is very simple and will be readily understood. The cooling apparatus can be conveniently located on the floor beneath the roaster and the chute M and arranged to receive the coffee directly from the roaster and discharge it into the top of the cylinder. When the coffee is thus turned into the chute, the air is preferably turned on into the pipe N, and the current of air will carry the coffee with it to the rear end of the cylinder. While this is not an essential feature of the invention and while the air-pipe N may be independent of the chute M, I have found the arrangement shown in the drawings to produce superior results, as in this way the coffee is distributed throughout the cylinder. The cylinder is thus rotated until the coffee has been sufficiently cooled, and during the rotation of the cylinder an air-current passes through the cylinder and the coffee therein continuously, this air being introduced under pressure through the pipe N and exhausted through the pipe L, suitable means being provided in both of these pipes to force the air in through the pipe N and draw it out through the pipe L. As the top of the cooling-cylinder is opened and exposed and as the trunnions are hollow, it is clear currents of air will be also established through the top of the cylinder and the hollow trunnions, thereby greatly increasing the air-currents and providing an abundant supply of fresh and cool air. The flights keep the coffee in a constant state of agitation while the cylinder is being revolved, so that the currents of cool air may be distributed throughout the quantity of coffee in the cylinder and cool the same thoroughly and rapidly. The flights which are adjacent to the cooling-cylinder are inclined, so that they will move the coffee to the front of the cylinder to facilitate the emptying of the cylinder after the coffee has been cooled. The inner flights, which are mounted upon the outer flights, are reversely inclined relative to said outer flights and operate to stir up the coffee and prevent it accumulating at the end of the cylinder. When the coffee is cooled, the door V is opened and the cylinder empties itself by reason of the arrangement of the flights therein. It will be observed that while the inner flights I tend to move some of the coffee toward the rear of the cylinder the outer flights, which are adjacent to the cylinder, will always be moving the coffee at the bottom toward the door.

If it is desired to provide a greater current of air, owing to the large capacity of the cooling-cylinder or for other reasons, additional forced currents may be provided through the hollow trunnions or either of them by connecting additional air-inlet pipes Z thereto.

I am aware that changes in the form and proportion of parts and in the details of construction of my improved apparatus may be made without departing from the spirit or sacrificing the advantages thereof, and it will be understood that I do not restrict myself to the particular embodiment herein shown and described, but reserve the right to make all such changes and alterations therein as fairly fall within the spirit and scope of the invention.

Having thus fully described my invention, what I claim, and desire to secure by Letters Patent, is—

1. In an apparatus for dry-cooling coffee the combination of a foraminous cylinder and means for revolving the same, agitating devices within the cylinder, a casing inclosing the lower portion of the cylinder, an exhaust-pipe communicating with said casing and means for inducing a current of air through the cylinder and the coffee therein contained while the cylinder is revolving and the coffee is being agitated, substantially as described.

2. In an apparatus for dry-cooling coffee, the combination of a foraminous cylinder and means for revolving the same, agitating devices within the cylinder, a casing inclosing the lower portion of said cylinder and leaving the upper portion exposed, an exhaust-pipe connected with said casing, and an air-inlet pipe, whereby currents of air are induced to flow through the coffee while it is being agitated and out through the exhaust-pipe, substantially as described.

3. In an apparatus for dry-cooling coffee, the combination of a foraminous cylinder and means for revolving the same, heads for said cylinder, trunnions journaled in bearings in said heads and carrying spiders supporting the cylinder, agitating devices within the cylinder and a casing inclosing the lower portion of the cylinder and terminating in an exhaust-pipe, substantially as described.

4. The combination of a foraminous cylinder and means for revolving the same, heads for said cylinder, hollow trunnions carrying the cylinder and journaled in bearings in the heads, a casing inclosing the lower portion of the cylinder and tapered at its bottom and communicating with an exhaust-pipe, agitating devices within the cylinder, an inlet-chute for delivering coffee into the cylinder and an air-pipe for discharging a current of air into the chute at its discharge end, substantially as described.

ISAAC D. RICHHEIMER.

Witnesses:
W. E. RUST,
WM. O. BELT.